United States Patent [19]
Neyret

[11] Patent Number: 5,883,359
[45] Date of Patent: Mar. 16, 1999

[54] HEATING PLUG FOR A CIGAR LIGHTER HAVING A PLURALITY OF ANNULAR SECTORS FOR ENGAGING THE HEATING RESISTANCE

[75] Inventor: Bertrand Neyret, Lyons, France

[73] Assignee: Valeo Vision, Bobigny Cedex, France

[21] Appl. No.: 687,468

[22] PCT Filed: Dec. 7, 1995

[86] PCT No.: PCT/FR95/01628

§ 371 Date: Nov. 26, 1996

§ 102(e) Date: Nov. 26, 1996

[87] PCT Pub. No.: WO96/17748

PCT Pub. Date: Jun. 13, 1996

[30] Foreign Application Priority Data

Dec. 8, 1994 [FR] France .................................. 94 14895

[51] Int. Cl.[6] .................................. B60N 3/14; F23Q 7/00
[52] U.S. Cl. ........................................... 219/270; 219/267
[58] Field of Search ..................................... 219/260–270, 219/542; 361/264–266

[56] References Cited

U.S. PATENT DOCUMENTS

| 3,909,587 | 9/1975 | Mattis . |
| 4,204,109 | 5/1980 | Horwitt et al. . |
| 4,731,521 | 3/1988 | Spector et al. . |
| 5,132,517 | 7/1992 | Von Gaisberg et al. . |
| 5,506,388 | 4/1996 | Martina .................................. 219/270 |

FOREIGN PATENT DOCUMENTS

| 2 457 787 | 3/1984 | France . |
| 2 701 438 | 3/1995 | France . |

*Primary Examiner*—John A. Jeffery
*Attorney, Agent, or Firm*—Morgan & Finnegan, L.L.P.

[57] ABSTRACT

The heating plug has a shroud containing a heating resistance of spiral form. The base of the shroud has embossed annular sectors for contact with the outer end of the resistance.

6 Claims, 1 Drawing Sheet

HEATING PLUG FOR A CIGAR LIGHTER HAVING A PLURALITY OF ANNULAR SECTORS FOR ENGAGING THE HEATING RESISTANCE

FIELD OF THE INVENTION

The present invention relates to cigar lighters, especially for motor vehicles, and more particularly it relates to the removable heating plug which forms part such a cigar lighter.

BACKGROUND OF THE INVENTION

As is well known, a cigar lighter comprises a lighter body which is secured on a fixed wall of the vehicle, such as a console or the fascia of the latter.

This body, firstly, carries electrical power supply components together with a current take-off member which is usually in the form of a bimetal strip, and, secondly, serves as a receptacle for the removable heating plug, which comprises two parts, one of which is movable axially with respect to the other against the action of axially acting resilient return means, in the manner which is described for example in the document FR-A-2 701 438.

More precisely, the movable part comprises a knob made of electrically and thermally insulating material, which is fixed to an electrically conductive support member that carries, and is insulated from, a terminal shroud which receives within it an electrical heating resistance of spiral form.

When the knob is pushed in, the shroud comes into engagement with the hooks of the current take-off bimetal strip, and an electrical circuit is set up which causes the heating resistance to become hot.

Once the said resistance reaches the desired temperature, the leaves of the bimetal strip dilate, and the knob reverts to its initial position under the action of the resilient return means. It then only remains for the plug to be removed, for a cigarette, for example, to be lit.

It is therefore important to obtain a reliable mechanical and electrical connection between the outermost turn of the spiral of the heating resistance and the inner wall of the shroud that receives the heating resistance.

BRIEF DESCRIPTION OF THE INVENTION

For this reason, the document FR-A-2 457 787 provides that the wall of the metallic shroud be deformed on to the outer periphery of the heating resistance, with a metallic ring being interposed.

This arrangement enables a reliable cigar lighter, and connection of the heating resistance without soldering, to be obtained.

Nevertheless, and in particular for cost reasons, it is desirable to reduce the number of components of the plug, and therefore to eliminate the metallic ring.

An object of the present invention is to respond to this desire, while preserving a reliable mechanical and electrical connection and without having any soldering between the shroud and the heating resistance.

According to the invention, a heating plug of the type described above, in which the assembly pin has a flange with an inclined upper shoulder facing away from the base of the shroud, is characterised in that the base of the shroud has, for contact with the outer end of the heating resistance, a plurality of annular sectors embossed towards the interior of the shroud, in that the outer end of the heating resistance is gripped between the said sectors and the wall of the shroud, which is deformed inwardly, while the inner end of the heating resistance hugs the profile of the inclined upper shoulder of the flange of the assembly pin, and in that the said sectors are located at the junction of the base with the rounded zone joining the latter to the wall of the shroud.

The invention enables the resistance to be fitted mechanically without any soldering, and the number of components is reduced, no ring being necessary.

In addition, the embossed sectors provide precentring for the electrically insulating ring which is interposed in the usual way between the base of the shroud and the flange of the pin by which it is assembled to the support member of the plug.

This arrangement enables any modification to be avoided in the assembly pin and in the electrically insulating ring which is interposed between the bases of the shroud and support member.

In addition, the sectors are easy to form, and they preserve mechanical strength due to the formation of free space between the embossed sectors. These sectors only require simple tooling. In general terms, it is easier to emboss the base of the shroud locally, and this preserves the base of the shroud.

Moreover, these sectors enable the wall of the shroud to be easily deformed inwardly. Besides this, good electrical contacts are obtained at the ends of the heating resistance. The inner end of the said resistance is forced into contact with the upper shoulder.

The embossed shoulders here are closed, and have a shallow depth.

BRIEF DESCRIPTION OF THE DRAWINGS

The following description illustrates the invention with reference to the attached drawings, in which.

DESCRIPTION OF THE PREFERRED EMBODIMENTS

Figure 1:
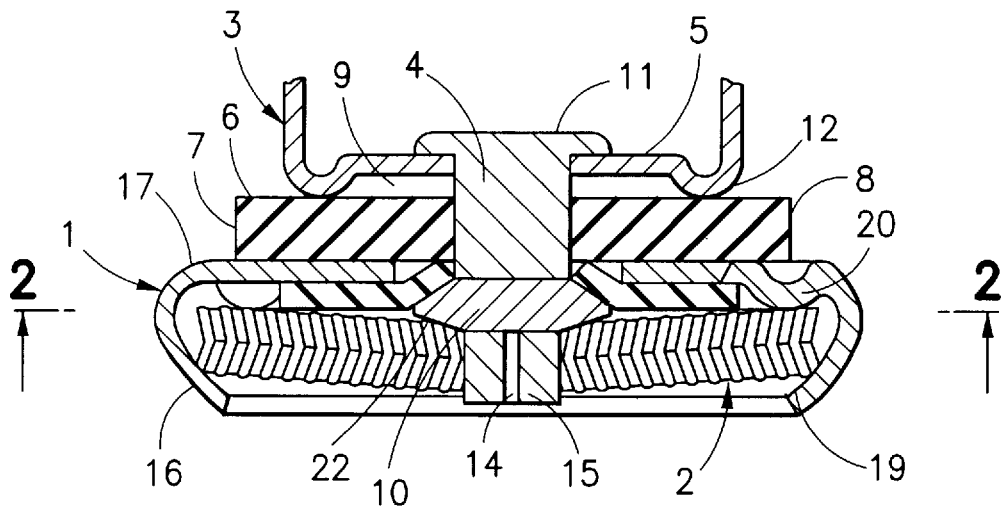
FIG. 1 is a view in axial cross section of part of the plug, showing the assembly of the resistance with its associated shroud in accordance with the invention.
Figure 2:
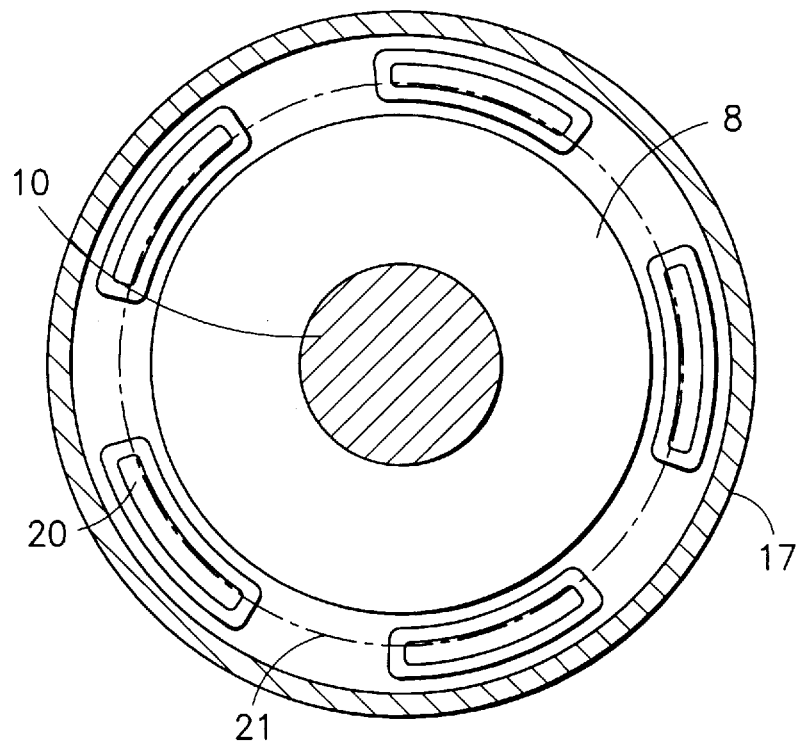
FIG. 2 is a view in axial cross section taken on the line 2—2 in FIG. 1.

FIG. 1 shows at 1 the electrically conductive end shroud, which is of metal in this example, of the heating plug of the cigar lighter.

The said shroud 1 has a central hole and serves as a receptacle for the heating resistance 2, which is of spiral form. It is arranged to cooperate in the manner described above with the leaves of the bimetal strip of the lighter body, for the purpose of heating the resistance 2.

The said shroud 1, which is of annular and hollow form, is fixed by an interposed electrically conductive pin 4 to the support member 3 of the removable plug.

For more detail as to the construction of the support member 3, which is also electrically conductive, reference should be made to the documents FR-A-2 457 787 and 2 701 438 mentioned above.

The said support member 3 is in the form of a metallic sleeve, and has a base 5 through which is passed the assembly pin 4 that serves to fasten the shroud 1 to the support member 3, with an electrically insulating outer ring 6 between the base 5 of the support member 3 and the base 7 of the shroud 1.

In another version, the ring 6 may be replaced by a fuse for electrically breaking the power supply circuit for the electrically conductive resistance 2 when the temperature exceeds a predetermined value.

In the base 7 of the shroud 1, there is disposed an electrically insulating inner ring 8, the inner edge of which makes abutment on an inclined annular shoulder 9 formed on a flange 10 of the pin 4. The shoulder 9 will be referred to as the lower shoulder 9, because it faces towards the base 7 of the shroud 1. The pin 4 is passed centrally through the support member 3 (i.e. through its base 5), and through the ring 6, the base 7 of the shroud 1, and the ring 8. The pin 4 is upset at 11 into contact with the base 5 of the support member 3, which has an annular peripheral bead 12 for contact with the insulating ring 6.

As will have been understood, and as is shown in the drawings, the support member 3 carries the shroud 1 and is insulated electrically from it, while the assembly pin 4 serves to center the ring 6. Due to the shoulder 9 in contact with the inner edge of the ring 8, automatic centering of the shroud 1 with respect to the pin 4, and therefore with respect to the support member 3, is obtained during the operation of upsetting the pin 4 into contact with the surface of the base 5 which faces away from the ring 6 and shroud 1.

After this upsetting operation, the inner edge of the ring 8 assumes a frusto-conical form, and penetrates into the central aperture of the shroud 1.

The axially flexible heating resistance 2, here in spiral form, has an inner end 14 which is lodged in a diametral slot formed at the free end 15 of the pin 4, so as to provide fastening and electrical connection of the resistance 2 with the support member 3 via the pin 4.

The resistance 2 is housed within the shroud 1, being surrounded by the annular side wall 16 of the shroud 1 which is provided at the outer periphery of its base 7. The wall 16 is initially orientated axially, and is joined integrally to the base 7 through a rounded zone 17. The hollow shroud 1 is thus delimited by the base 7 and the wall 16.

The resistance 2 is initially introduced into the shroud 1 by being inserted, by its inner end 14 (i.e. its endmost turn) into the end slot of the pin 4. Its outer endmost turn 19 is then in contact with the straight metallic wall 16 of the shroud 1.

The wall 16 of the metallic shroud 1 is then deformed inwardly (i.e. towards the base 7 of the shroud) so as to give it, in the manner known per se, the external profile which is necessary for its cooperation with the hooks of the current pick-up bimetal strip (not shown) of the cigar lighter, and so that simultaneously, the spiral 2 (i.e. the heating resistance) becomes disposed in the way shown in FIG. 1. The wall 16 thus envelops the resistance 2.

More precisely, in accordance with the invention, the base 7 of the shroud 1 has annular sectors 20, which in this example are spaced apart at regular intervals, at its outer periphery, at the level of its junction with the rounded zone 17 that joins it to the side wall 16.

These sectors 20 are formed by embossing the base 7 in a direction away from the insulating ring 6, and therefore towards the inside of the shroud 1.

They have a generally semicircular cross section, and are located on a common mean pitch circle 21. Their depth is generally equal to the thickness of the ring 8. The said sectors 20 are arranged to make contact with the outer end 19 of the resistance 2, and permit precentring of the ring 8 which is fitted inside the said sectors 20. These sectors 20 thus extend the ring 8 outwardly in such a way that the resistance 2 is unable to become embedded in the ring 8, which is thus protected.

In a first operation, the pin 4 is upset so as to fix the rings 6, 8 in position; and the shroud 1 is fixed to the support member 3.

The resistance 2 is subsequently fitted inside the shroud 1, by inserting the inner end 14 (or first turn) of the resistance 2 on to the slotted free end 15 of the pin 4, after which the wall 16 is deformed inwardly by what is generally a rolling operation.

During this operation, the resistance 2 comes into contact with the sectors 20, and its outer end 19 (i.e. its last turn) is deformed (pressed) towards the base 7, by being caused to penetrate into the space delimited by the rounded zone 17.

The penultimate turn of the resistance is thus pressed automatically into contact with the sectors 20, which are in the form of oblong bosses. In this example, several turns are in contact with the sectors, thus assisting good electrical connection.

Preferably, to this end, the turns of the resistance 2 have a V-shaped cross section. Thus the outer end 19 of the resistance 2 is gripped between the said sectors 20 and the wall 16 of the shroud 1, the latter having been deformed inwardly.

It will be appreciated that in accordance with the invention (FIG. 1), after the wall 16 has been rolled to shape, the resistance 2 hugs the profile of the flange 10, and more particularly the profile of the upper inclined shoulder 22 of the flange 10, on the opposite side from its shoulder 9, the said flange 10 having a cross section which is generally V-shaped. The shoulder 22 is referred to as the upper inclined shoulder, because it faces away from the base 7 of the shroud 1. This shoulder lies in superelevation with respect to the sectors 20, so that at least the penultimate turn of the inner end 14 of the resistance is forced into contact with the said shoulder 22. Good electrical contacts are thus obtained.

This effect is enhanced by the fact that the depth of the embossed sectors 20 is generally equal to the height of the ring 8 in contact with the inclined lower shoulder 9. In this way, very good mechanical and electrical connections are obtained between, firstly, the pin 4 and the inner end of the resistance 2, and, secondly, between the wall 16, the sectors 20 and the outer end of the resistance 2, which is moreover fitted without precompression, and which is enveloped by the wall 16.

It will be appreciated that the embossing of the sectors 20 avoids the use of a non-standard ring 6, and that the ring 8 is smaller than that in the document FR-A-2 457 787. In this way, material is economised while the shroud 1 is not significantly modified.

In addition, the embossed shoulders 20 stiffen the shroud 1, and the pin 4 remains unchanged. Moreover, the number of components is reduced, and the resistance 2 is bent and protected.

It will be appreciated that the V-shaped cross section of the resistance 2 enables damage to the turns of the resistance 2 to be avoided, especially while the base 16 is being deformed.

It will also be appreciated that the oblong sectors 20 are closed and shallow. This derives in particular from the fact that it is possible to reduce the thickness of the ring 8, because the outer end 19 of the resistance 2 does not become embedded in the ring 8.

In addition, several turns can easily come into contact with the rounded sectors 20, due to the free spaces that exist between the sectors 20, and due to the axial flexibility of the resistance 2.

The said sectors 20, being closed, have a shape which will not damage the resistance 2, and they make no significant modification to the shroud 1. The number of sectors 20 does of course depend on the application.

I claim:

1. A heating plug for a cigar lighter, especially for a motor vehicle, comprising a terminal shroud carried, with electrical insulation, by a support member through an interposed assembly pin having a slotted free end, for fitting therein the inner end of a heating resistance of spiral form housed within the shroud the shroud being delimited by an annular side wall which is joined through a rounded zone to a base through which the assembly pin is passed, in which the assembly pin has a flange with an inclined upper shoulder facing away from the base of the shroud, characterised in that the base of the shroud has, for contact with the outer end of the heating resistance, a plurality of annular sectors embossed towards the interior of the shroud, in the outer end of the heating resistance is gripped between the sectors and the wall of the shroud, which is deformed inwardly, while the inner end of the heating resistance hugs the profile of the inclined upper shoulder of the flange of the assembly pin, and in that the sectors are located at the junction of the base with the rounded zone joining the latter to the wall of the shroud.

2. A plug according to claim 1, characterised in that the embossed sectors have a generally semicircular cross section.

3. A plug according to claim 1, in which an electrically insulating ring is interposed between the base of the shroud and an inclined lower shoulder of the flange of the assembly pin, characterised in that the height of the embossed sectors is generally equal to the height of the said ring.

4. A plug according to claim 1, characterised in that the embossed sectors are of oblong form.

5. A plug according to claim 4, characterised in that each of the embossed sectors comprises a continuous surface having peripheral edges which integrally adjoin the base of the shroud.

6. A plug according to claim 5, characterised in that the height of the embossed sectors are generally less than the distance between the base of the shroud and the inclined upper shoulder.

* * * * *